(12) United States Patent
Gollier et al.

(10) Patent No.: US 10,416,461 B2
(45) Date of Patent: Sep. 17, 2019

(54) PANCAKE LENS WITH LARGE FOV

(71) Applicant: Facebook Technologies, LLC, Menlo Park, CA (US)

(72) Inventors: Jacques Gollier, Redmond, WA (US); Wai Sze Tiffany Lam, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 66 days.

(21) Appl. No.: 15/335,807

(22) Filed: Oct. 27, 2016

(65) Prior Publication Data

US 2018/0120579 A1 May 3, 2018

(51) Int. Cl.
*G02B 27/02* (2006.01)
*G02B 27/28* (2006.01)
(Continued)

(52) U.S. Cl.
CPC .............. *G02B 27/022* (2013.01); *G02B 3/06* (2013.01); *G02B 5/10* (2013.01); *G02B 5/305* (2013.01); *G02B 5/3083* (2013.01); *G02B 13/06* (2013.01); *G02B 17/004* (2013.01); *G02B 17/0804* (2013.01); *G02B 17/086* (2013.01);
(Continued)

(58) Field of Classification Search
CPC .................. G02B 3/02–06; G02B 5/10; G02B 5/3041–305; G02B 5/3083; G02B 13/06; G02B 13/18; G02B 17/004; G02B 17/0804–0808; G02B 17/0856–086; G02B 27/0025; G02B 27/01; G02B 27/0101; G02B 27/017; G02B 27/0172; G02B 27/022; G02B 27/10; G02B 27/142; G02B 27/144; G02B 27/145; G02B 27/148; G02B 27/2228–2235; G02B 27/2257; G02B 27/26; G02B 27/283; G02B 27/286;
(Continued)

(56) References Cited

U.S. PATENT DOCUMENTS 5,801,885 A * 9/1998 Togino ............... G02B 27/0172
359/630
5,973,760 A 10/1999 Dehmlow
(Continued)

OTHER PUBLICATIONS

U.S. Appl. No. 62/302,675, filed Mar. 2, 2016, Inventors Ying Geng et al.

*Primary Examiner* — Stephone B Allen
*Assistant Examiner* — James McGee
(74) *Attorney, Agent, or Firm* — Fenwick & West LLP

(57) ABSTRACT

A HMD includes an electronic display and a pancake lens block. The pancake lens block includes a back curved optical element and a front curved optical element. Light propagating through the pancake lens block undergoes multiple reflections and to mitigate parasitic reflections, there are no air gaps between optical elements of the pancake lens block. A hybrid film that operates as a waveplate surface and a mirrored surface can be placed between the front curved optical element and the back curved optical element. A wide FOV can be obtained by making the coupling surfaces of the front optical element and the back optical element to be based on a convex cylindrical surface profile and a concave cylindrical surface profile, with the axis of the cylinder surface in a vertical direction for a user wearing the HMD.

16 Claims, 13 Drawing Sheets

(51) Int. Cl.
*G06F 3/01* (2006.01)
*G06F 3/0346* (2013.01)
*G02B 17/00* (2006.01)
*G02B 5/10* (2006.01)
*G02B 5/30* (2006.01)
*G02B 13/06* (2006.01)
*G02B 17/08* (2006.01)
*G02B 3/06* (2006.01)
*G06F 1/16* (2006.01)
*G02B 27/01* (2006.01)

(52) U.S. Cl.
CPC ..... *G02B 17/0856* (2013.01); *G02B 27/0172* (2013.01); *G02B 27/286* (2013.01); *G06F 1/163* (2013.01); *G06F 3/011* (2013.01); *G06F 3/012* (2013.01); *G06F 3/0346* (2013.01); *G02B 2027/012* (2013.01); *G02B 2027/0123* (2013.01)

(58) Field of Classification Search
CPC ........... H04N 13/0429; H04N 13/0436; H04N 13/044; H04N 13/0443
USPC ........ 359/466, 471–472, 474, 475, 480–482, 359/485.07, 489.07, 489.11–489.12, 359/489.15–489.16, 489.18, 583, 629, 359/648, 708, 710, 725, 726–732, 839, 359/859; 348/51–53
See application file for complete search history.

(56) References Cited

U.S. PATENT DOCUMENTS 9,829,616 B2 * 11/2017 Yun ........................ G02B 5/305
2007/0070508 A1 3/2007 Ruhle et al.
2017/0068096 A1 3/2017 Ouderkirk et al.

* cited by examiner

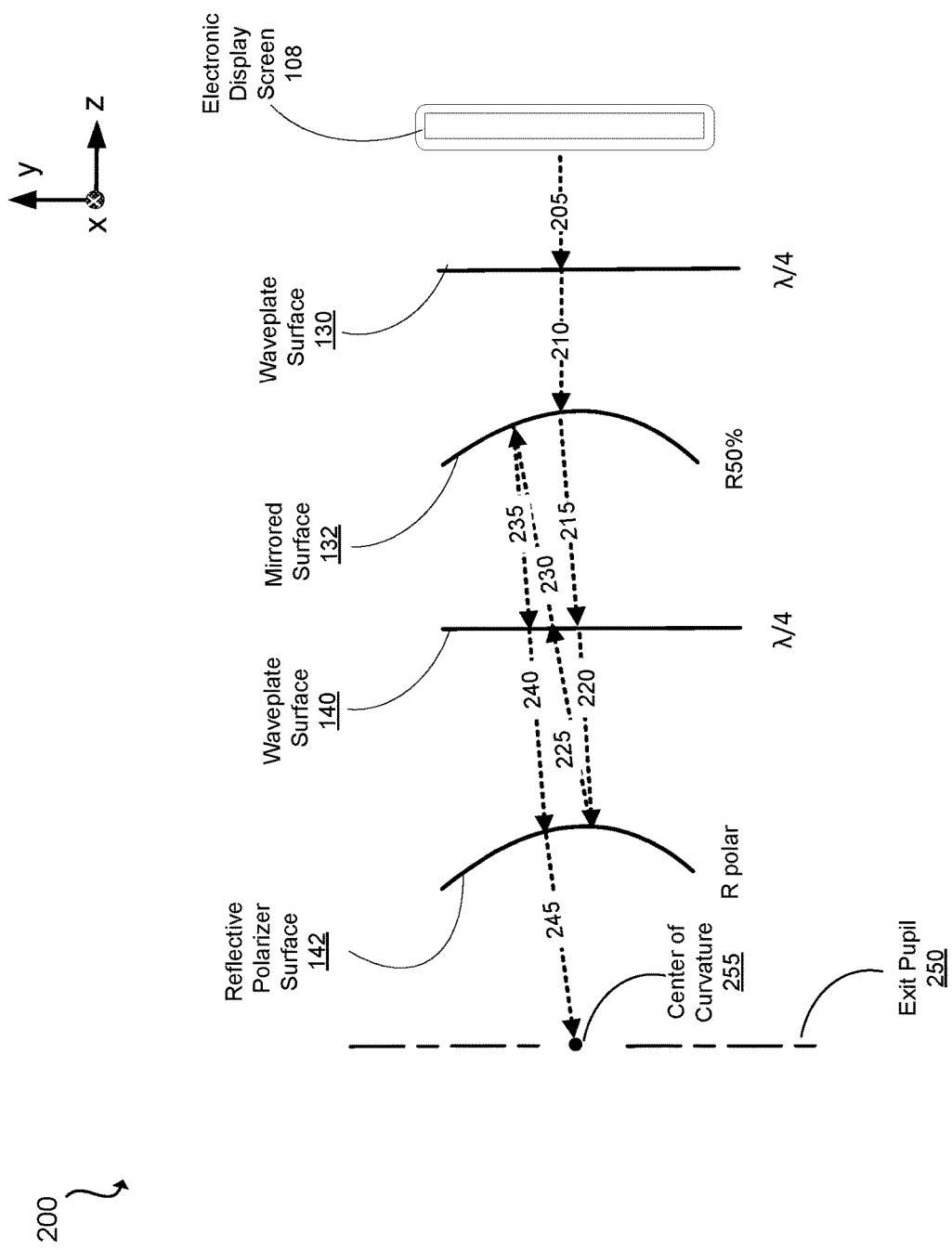

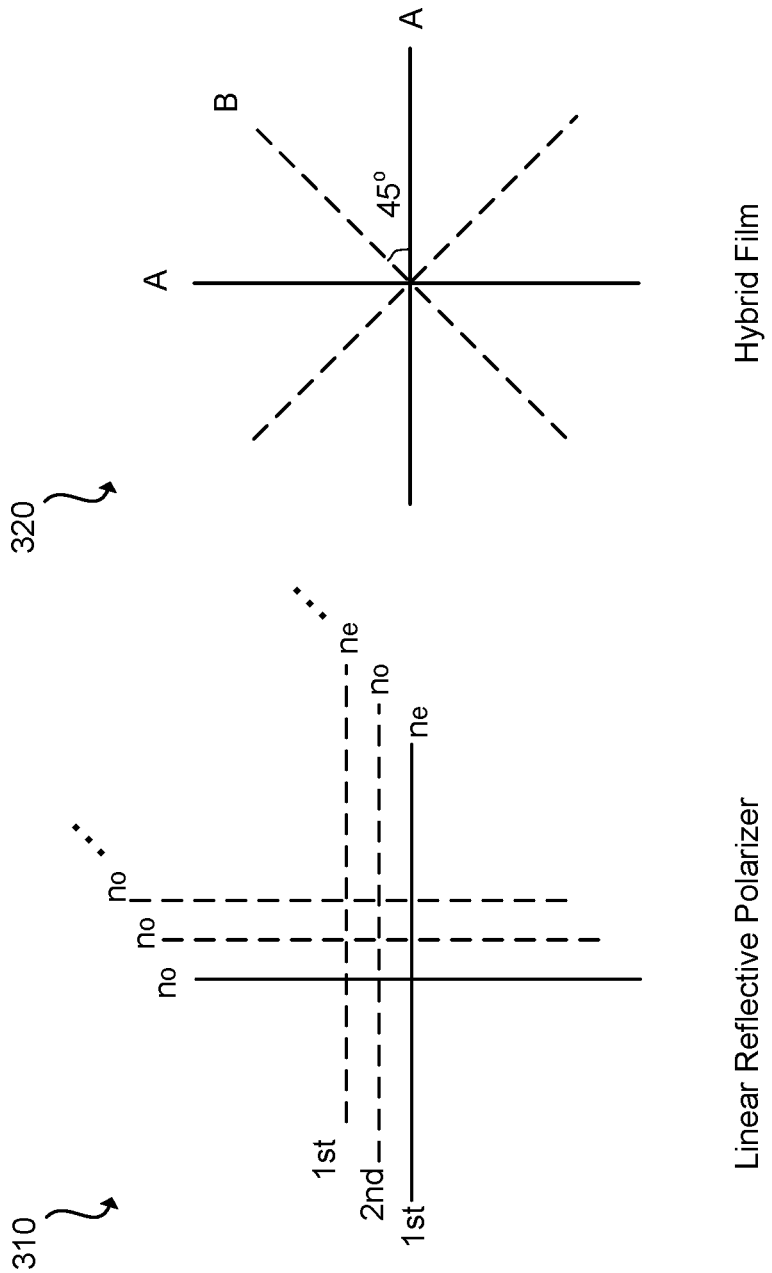

__US 10,416,461 B2__

PANCAKE LENS WITH LARGE FOV

BACKGROUND

The present disclosure generally relates to enhancing images from electronic displays, and specifically to increasing a field of view (FOV) of an electronic display.

In a head-mounted display (HMD) a user's eye occupies a region of space generally referred to as an eyebox (typically there is a respective eyebox for a left and a right eye of the user). The HMD displays and directs content to the eyeboxes. In some conventional systems multiple optical elements direct the content to the eyeboxes, and light can be reflected in between optical elements and parasitic reflections can lead to poor contrast in the content being presented to the user.

Additionally, as a user moves their eye within an eyebox and/or the position of the HMD changes relative to the position of the user's head, the location of the user's eye within an eyebox may change. Changes in the location of the eye within an eyebox may result in distortions in the content being presented to the user. This effect is known as pupil swim, and it can be a problem for HMDs for various reasons including, e.g., increased calibration difficulty, and motion sickness due to problems with vertical disparity. Conventional approaches for reducing pupil swim add complexity to HMDs.

SUMMARY

A HMD comprises an electronic display and a pancake lens block to alter the display image light to a user wearing the HMD. The pancake lens block comprises a back curved optical element and a front curved optical element. The back curved optical element includes a back first surface and a back second surface, the back first surface configured to receive the image light and the back second surface configured to output altered image light. The front curved optical element includes a front first surface and a front second surface, the front second surface coupled to the back second surface such that the back curved optical element and the front curved optical element form a monolithic optical element. A first portion of the altered image light is reflected by a surface of the front curved optical element toward the back curved optical element and a surface of the back curved optical element reflects a second portion of the first portion of the altered image back to the front curved optical element for transmission to an exit pupil of a user wearing the HMD.

Light propagating through the pancake lens block undergoes multiple reflections, so to mitigate parasitic reflections that reduce the contrast for an image displayed from the electronic display, the pancake lens block is a monolithic pancake lens block with no air gaps between optical elements of the pancake lens block. Additionally, the pancake lens block mitigates field curvature and accordingly acts to reduce pupil swim.

In one embodiment, the pancake lens block includes a front waveplate placed between the front second surface and the back second surface and a back waveplate. The curvature of the front waveplate and the back waveplate are concentric or close to concentric to increase intended throughput of light, suppress stray light, and improve the overall contrast. The curvature of the two curved surfaces (front waveplate and back waveplate) being concentric means the two curved surfaces share the same center of curvature.

In one embodiment, a hybrid film operating as a waveplate surface and a mirrored surface is placed between the front curved optical element and the back curved optical element. The hybrid film can be made with the same materials as a linear reflective polarizer film with a modification in the manufacturing process.

In one embodiment, a monolithic pancake lens block is designed with a wide FOV (e.g., 180 degrees). Such a wide FOV can be made in a monolithic pancake lens by making the coupling surfaces of the front optical element and the back optical element to be based on the shape of a cylinder, with the axis of the cylinder parallel to the vertical direction for a user wearing the HMD. Having the coupling surfaces of the front optical element and the back optical element based on the shape of a cylinder facilities the insertion or placement of a planar film or layer between or on the front optical element and the back optical element because a planar film or layer can be rolled into the geometry of a cylinder without distorting the film or layer.

BRIEF DESCRIPTION OF THE DRAWINGS

FIG. 2 shows example light transmission and reflection happening in the pancake lens block, in accordance with one embodiment.

FIG. 3A is an example of a linear reflective polarizer.

FIG. 3B is an example of a circular reflective polarizer, in accordance with at least one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
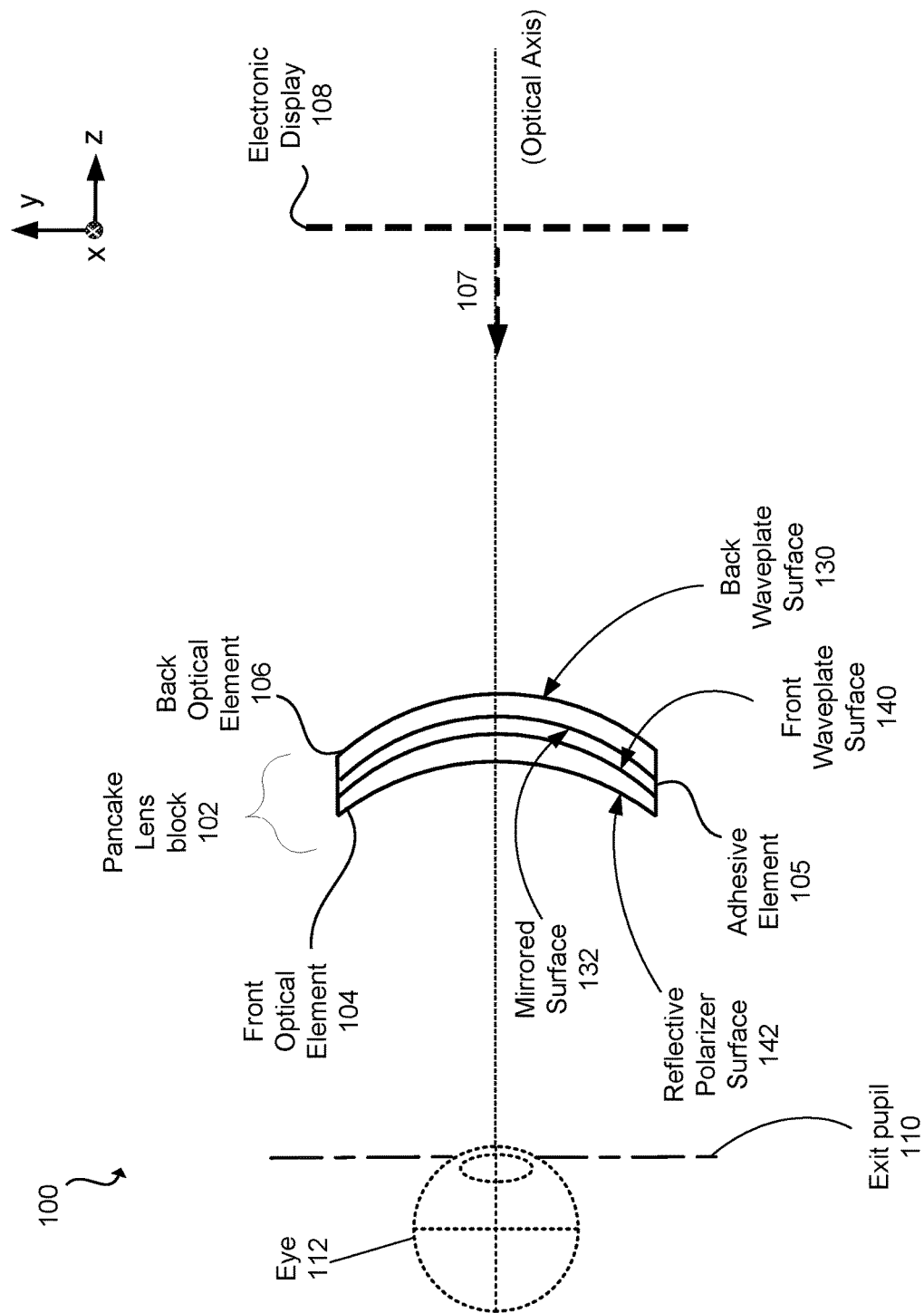
FIG. 1A is a cross section of an example monolithic pancake lens block, in accordance with one embodiment.

FIG. 1A is a cross section 100 of an embodiment of a pancake lens block 102, in accordance with an embodiment. In some embodiments, the pancake lens block 102 is part of a HMD and includes a front optical element 104 and a back optical element 106 that directs light 107 emitted from an electronic display 108 to an exit pupil 110 where a user's eye 112 is positioned. The front optical element 104 and the back optical element 106 are coupled together with an adhesive element 105 to make a monolithic pancake lens block. For purposes of illustration, FIG. 1A shows a cross section 100 of the pancake lens block 102 associated with a single eye 112, but another pancake lens block, separate from the pancake lens block 102 shown in FIG. 1A, can provide light from an electronic display that is altered by the pancake lens block to another eye of the user. Some embodiments of the pancake display assembly have different components than those described here. Similarly, in some cases, functions can be distributed among the components in a different manner than is described here.

The light 107 emitted from the electronic display 108 is linearly polarized. In some embodiments, the electronic display 108 includes one or more linear polarizers that linearly polarizers light emitted from the electronic display 108. Alternatively, light emitted from light emitting components (e.g., LEDs) is emitted as linearly polarized light.

The pancake lens block 102 includes a front optical element 104 and a back optical element 106 that are coupled together to create a monolithic optical element. One or more surfaces of the front optical element 104 and the back optical element 106 are shaped to correct for field curvature. One or more surfaces of front optical element 104 may be shaped to be spherically concave (e.g., a portion of a sphere), spherically convex, a rotationally symmetric asphere, a freeform shape, or some other shape that mitigates field curvature. In some embodiments, the shape of one or more surfaces of the front optical element 104 and the back optical element 106 are designed to additionally correct for other forms of optical aberration. In some embodiments, one or more of the optical elements within the pancake lens block 102 may have one or more coatings, such as anti-reflective coatings, to reduce ghost images and enhance contrast.

In some embodiments, the back optical element 106 includes a back waveplate surface 130 and a mirrored surface 132. The back waveplate surface 130 and the mirrored surface 132 may be separate layers or coatings that are bonded to or formed on the back optical element 106. The back optical element 106 has a back first surface and a back second surface. The back waveplate surface 130 may be bonded or formed on the back first surface of the back optical element 106. The mirrored surface 132 may be bonded or formed on the back second surface of the back optical element 106. In this example, the back waveplate surface 130 is a quarter-waveplate that alters the polarization of received light. A quarter-waveplate includes a polarization axis and the back waveplate surface 130 is oriented with polarization axis 45 degrees relative to incident linearly polarized light such that the back waveplate surface 130 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. In one embodiment, the quarter-waveplates are designed to be optimized such that the dependence of the retardance induced by two plates cancel each other, so that total effect of the waveplates on straight through stray light path is independent of the wavelength and the angle of incidence. This usually requires the use of achromatic waveplate. The mirrored surface 132 is partially reflective to reflect a portion of the received light. In some embodiments, the mirrored surface 132 is configured to transmit 50% of incident light and reflect 50% of incident light. In alternate embodiments, discussed below with regard to FIG. 3B, the mirrored surface 132 may be replaced with a hybrid film that acts as both a quarter-waveplate and a reflective polarizer.

The front optical element 104 includes a front waveplate surface 140 and a reflective polarizer surface 142. The front waveplate surface 140 and the reflective polarizer surface 142 may be separate layers or coatings that are bonded or formed on the front optical element 104. The front optical element 104 has a front first surface and a front second surface. The reflective polarizer surface 142 may be bonded or formed on the front first surface of the front optical element 104. The front waveplate surface 140 may be bonded or formed on the front second surface of the front optical element 104. The front waveplate surface 140 is also a quarter-waveplate and the reflective polarizer surface 142 is a partially reflective mirror configured to reflect received light of a first linear polarization and transmit received light of a second linear polarization. For example, the reflective polarizer surface 142 may be configured to reflect linearly polarized light with a polarization direction in the x direction, and pass light that is linearly polarized in the y direction. In alternate embodiments, discussed below with regard to FIG. 3B, the front waveplate surface 140 may be replaced with a hybrid film that acts as both a quarter-waveplate and a reflective polarizer. In some embodiments, curvature of the front waveplate surface 140 and the back waveplate surface 130 are concentric or close to concentric. Making the curvatures concentric increases intended throughput of light, suppresses stray light, and improves the overall contrast. The contrast improvement is a function of the concentricity of the two surfaces. The maximum contrast occurs when the two surfaces are completely concentric (this is also a function of the material properties), and the contrast decreases when deviating from the two surfaces being completely concentric. Thus, depending on the contrast requirement and the limit of how the surfaces can be curved, the two surfaces may deviate from being completely concentric to meet the contrast requirement. Another embodiment of a pancake lens block with matching curvatures of quarter-waveplates is discussed below with regard to FIG. 1C.

An adhesive element 105 couples the front optical element 104 and the back optical element 106 together into a monolithic optical element. The adhesive element 105 may be index matched or close to index matched to the front optical element 104 and the back optical element 106 and/or coatings on the surfaces of the optical elements. The adhesive element 105 may be thin such that the thickness of the adhesive element does not affect the overall optical power of the system. The adhesive element 150 may have zero or low polarization properties to not affect the polarization states of light passing through the adhesive element 150. The monolithic aspect of the pancake lens block 102 reduces parasitic reflection between the two reflective surfaces that can exist if the reflective polarizer surface 142 and the mirrored surface 132 are separated by an air gap. The removal of the air gap between the front optical element 104 and the back optical element 106 reduces the parasitic reflection and leakage between the two reflective surfaces.

The pancake lens block 102 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of a user's eye within an eyebox that results in distortions in the content being presented to the user. Correcting for field curvature mitigates pupil swim. The pancake lens block 102 mitigates field curvature in an image that is output to a user's eyes to reduce pupil swim. Additionally, the pancake lens block 102 has a small form factor, is relatively low weight compared to other optical systems designed to remove field curvature and is configured to have a wide FOV. The operation of the pancake lens block 102 is discussed below with regard to FIG. 2.

Figure 1B:
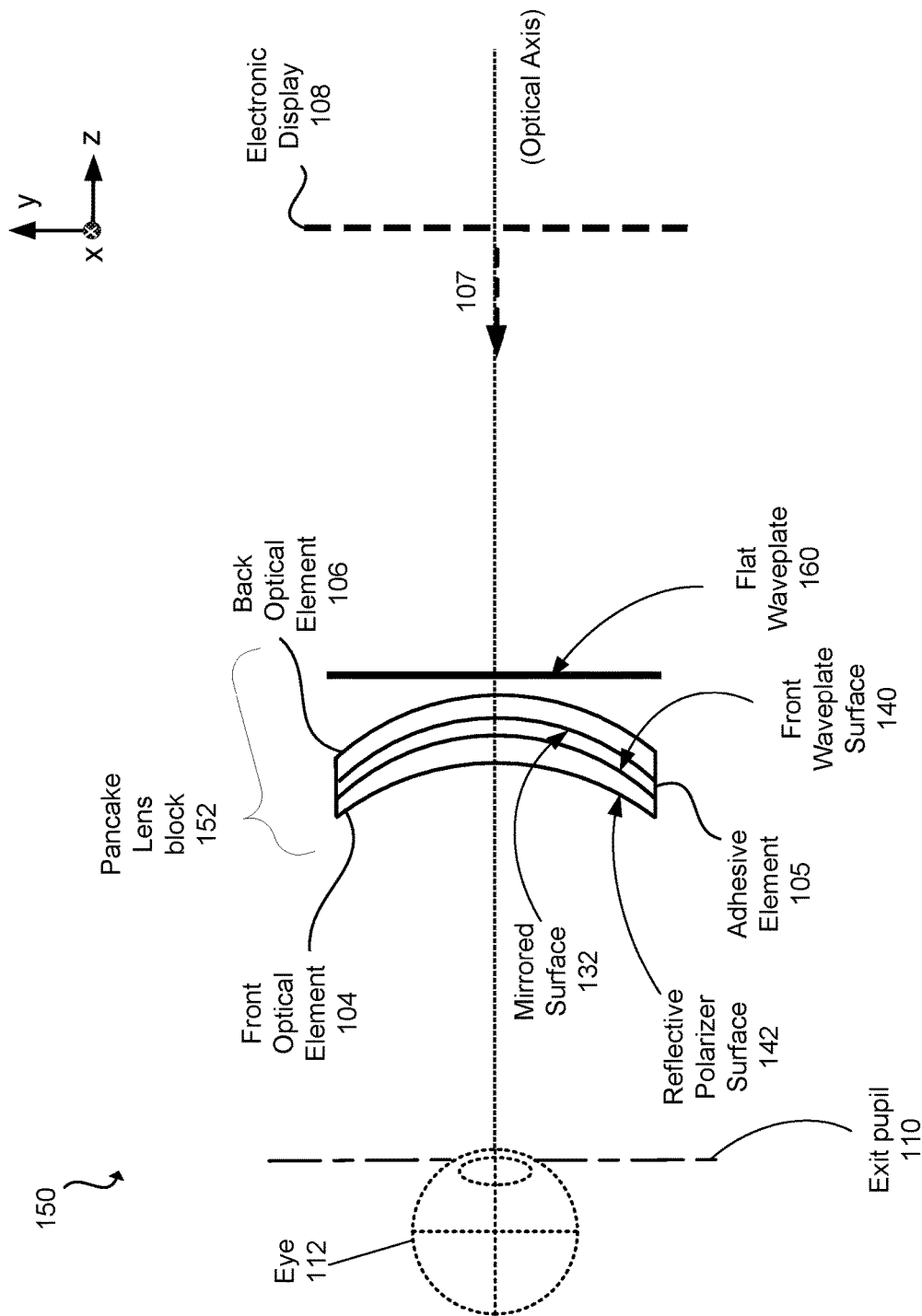
FIG. 1B is a cross section of an example monolithic pancake lens block with a flat waveplate, in accordance with one embodiment.

FIG. 1B is a cross section 150 of an example monolithic pancake lens block 152 with a flat waveplate 160, in accordance with one embodiment. The pancake lens block 152 of FIG. 1B is similar to pancake lens block 102 of FIG. 1A, except the pancake lens block 152 does not include a back waveplate surface 130 and includes a separate flat waveplate 160. Although the flat waveplate 160 is a separate optical element, the pancake lens block 152 is still monolithic in the sense that optical elements with reflective surfaces are not separated by an air gap (e.g., the reflective polarizer surface 142 and the mirrored surface 132). This embodiment allows use of a planar film (e.g. flat waveplate 160) for a waveplate surface of the pancake lens block 152. Use of a planar film for the back waveplate surface 130 may be difficult for the embodiment of FIG. 1A in which the back waveplate surface 130 is bonded or formed on a back first surface of back optical element 106, which may have high curvature. There may be a decrease in the overall throughput of light (intended ray path) through the pancake lens block 152 due to a retardance mismatch between the flat waveplate 160 and the front waveplate surface 140 (e.g., curved waveplate surface). Additionally, the retardance mismatch may increase the light leakage (unintended ray or stray light) by a factor of two and a half over a curved waveplate embodiment which will be described below in regard to FIG. 1C and result in a decrease in overall contrast.

Figure 1C:
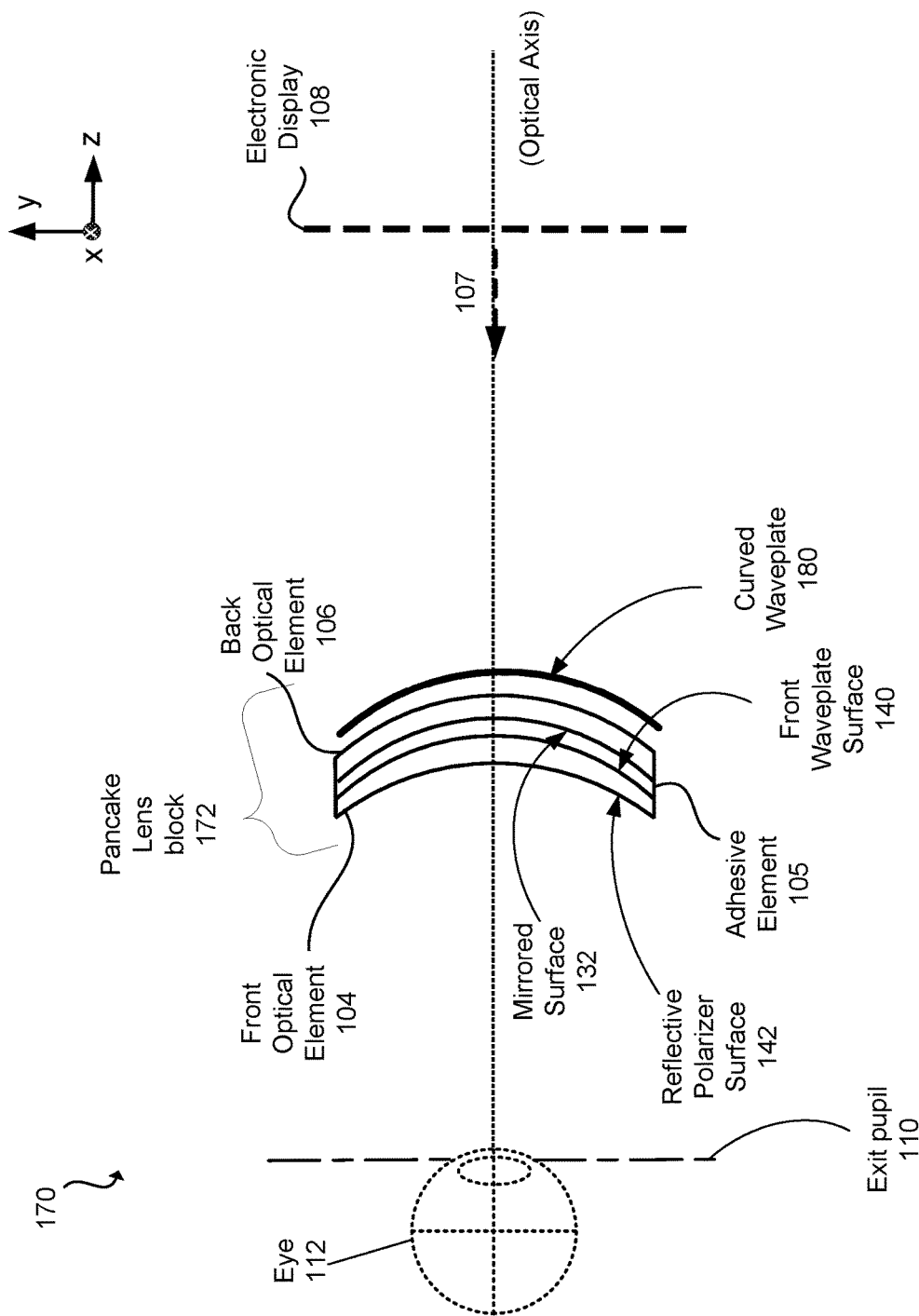
FIG. 1C is a cross section of an example monolithic pancake lens block with a curved waveplate, in accordance with one embodiment.

FIG. 1C is a cross section 170 of an example monolithic pancake lens block 172 with a curved waveplate 180, in accordance with one embodiment. The pancake lens block 172 of FIG. 1C is similar to pancake lens block 102 of FIG. 1B, except the pancake lens block 172 has a curved waveplate 180 instead of a flat waveplate 160. The curved waveplate 180 has a shape that matches the shape of the front waveplate surface 140. For example, the curvature of the curved waveplate 180 and the curvature of the front waveplate surface 140 are concentric or close to concentric. The curved waveplate 180 of FIG. 1C has an advantage over a flat waveplate 160 of FIG. 1B in that the curved waveplate 180 increases intended throughput of light, suppresses stray light, and improves the overall contrast. The overall contrast may be improved by almost two fold over the case of FIG. 1B.

FIG. 2 shows example light propagation in the pancake lens block 102 shown in FIG. 1A, in accordance with one embodiment. The light 205 from the electronic display 108 is linearly polarized. The back waveplate surface 130 (quarter-waveplate) has an axis 45 degrees relative to the direction of polarization of light 205. The orientation of the waveplate axis relative to the incident linearly polarized light controls the handedness of the emitted circularly polarized light. The back waveplate surface 130 changes the polarization of light 205 from a linear polarization to a circular polarization—shown as the light 210. The polarization of the light 210 may be clockwise or anti-clockwise based on the orientation of the axis of the back waveplate surface 130 relative to incident linearly polarized light. A first portion of the light 210 is reflected by the mirrored surface 132, and a second portion of the light 215 is transmitted by the mirrored surface 132 towards the front waveplate surface 140. In some embodiments, the mirrored surface 132 is configured to reflect 50% of the incident light (e.g., the light 210). Similarly, the front waveplate surface 140 is a quarter-waveplate and changes the polarization of the light 215 from circular to linear (referred to as the light 220).

The light 220 is incident on the reflective polarizer surface 142, which reflects light that is polarized in a blocking direction (e.g., x direction) and transmits light that is polarized in a perpendicular direction (e.g., y direction). At this point, the light 220 is linearly polarized in the blocking direction. Thus, the reflective polarizer surface 142 reflects the light 220 and the reflected light is referred to as the light 225. The front waveplate surface 140 changes the linear polarized light 225 to a circularly polarized light 230 and a mirrored surface 132 reflects a portion of the polarized light 230, as described above. The reflected portion of the light 230 is referred to as a light 235.

The light 235 is also circularly polarized; however, its handedness is opposite that of the light 230 and the light 215 due to the reflection from the mirrored surface 132. Thus, the front waveplate surface 140 changes the polarization of the circularly polarized light 235 to a linearly polarized light 240. However, as the handedness of the light 235 is opposite to that of the light 215, the polarization of the light 240 is perpendicular to that of the light 220. Accordingly, the light 240 is linearly polarized in a direction (e.g., y) perpendicular to the blocking direction (e.g., x) and is therefore transmitted by the reflective polarizer surface 142 as the light 245 to the exit pupil 250.

Light propagating through the pancake lens block 102, thus, undergoes multiple reflections between the back optical element 106 and the front optical element 104. If there are air gaps separating front optical element 104 and back optical element 104, then light propagating through the pancake lens block 102 can have parasitic reflections that reduce the contrast for an image displayed from the electronic display 108. Thus, it is advantageous to have a monolithic pancake lens block to mitigate the problem of reduced contrast due to parasitic reflections. Use of a monolithic pancake lens may result in improved contrast values that are at least three times a contrast value from use of a pancake lens block with air gaps. Light propagating through the pancake lens block 102 passes through multiple materials (i.e., waveplates, reflectors, glass, adhesive etc.) each having different indices of refraction. These materials can be chosen to allow back optical element 106 and front optical element 104 to compensate each other to remove field curvature. For example, field curvature is minimized by designing the difference surfaces of back optical element 106 and front optical element 104 to have radii and indices or refraction that minimize the Petzval Sum:

$$\sum_i \frac{n_{i+1} - n_1}{r_i n_i + 1 n_i},$$

where r is the radius of the $i^{th}$ surface and the n is the indices of refraction on the first and second side of each optical element. Further, minimizing the distance between center of curvature 255 (which may or may not be the same for both optical elements) and a user's pupils minimizes the distortion caused by field curvature. Thus, in some embodiments, the center of curvature 255 is positioned as near as reasonably possible to the pupils of a user's eyes (e.g., at the exit pupil 250).

In one embodiment, although not shown in FIG. 1A, the waveplate surface 140 of the front optical element 104 and the mirrored surface 132 of the back optical element 106 are combined into a hybrid film. The front optical element 104, the hybrid film, and the back optical element 106 are bonded together by the adhesive element 105. The hybrid film performs the function of the front waveplate surface 140 and the mirrored surface 132 combined. In one embodiment, the hybrid film can be made with the same materials as a linear reflective polarizer film (e.g., a film that could be used as the reflective polarizer surface 142 for the front optical element 104) with a modification in the manufacturing process.

FIG. 3A is an example of a linear reflective polarizer 310. The linear reflective polarizer 310 is made by stacking and combining a number of plastic sheets. The plastic sheets are stretched to create an ordinary refractive index in one direction and an extraordinary refractive index in another direction. A first type of sheet is produced to have an extraordinary refractive index along a first axis (e.g., x-axis) and an ordinary refractive index along a second axis (e.g., y-axis). A second type of sheet is produced to have an ordinary refractive index along a first axis and an ordinary refractive index along a second axis. A stack of sheets are made by alternating many first and second type of sheets, with the orientation of the first type of sheet relative to the second type of sheet resulting in the refractive index alternating from extraordinary to ordinary for the first axis while remaining an ordinary refractive index on the second axis. Thus, the stack of sheets act as a linear reflective polarizer, reflecting light along the first axis and transmitting light along the second axis. The thickness of each sheet may be optimized for maximum reflection for light polarized along the first axis and maximum transmission for light polarized along the second axis.

FIG. 3B is an example of a hybrid film 320, in accordance with at least one embodiment. The hybrid film 320 is made with the same types of plastic sheets used to make the linear reflective polarizer. However, one or more sheets A of the linear reflective polarizer have their first axes (e.g. x-axis with an ordinary refractive index) rotated 45 degrees relative to the fast axis (e.g., 45 degrees from x-axis with an extraordinary refractive index) of sheets B in the stack of sheets. The hybrid film 320 performs the function of the front waveplate surface 140 and the mirrored surface 132 combined. Thus, the number of active surface, or coatings required for the monolithic pancake lens can be reduced.

In one embodiment, a monolithic pancake lens block is designed with a wide FOV (e.g., 180 degrees). Optical elements such as the back optical element and the front optical element of the pancake lens block require high optical curvature to produce large FOVs. Having high optical curvature on the front and back optical elements of the pancake lens block will introduce problems when inserting a film (e.g., front waveplate surface 140, mirrored surface 132, or a hybrid film 320) in a planar manner between the optical elements of high curvature. A monolithic pancake lens block can be designed with a wide FOV in the x-axis over the y-axis (e.g., for a user of the HMD, a larger FOV in the horizontal direction than the vertical direction). Such a wide FOV can be made in a monolithic pancake lens by making the coupling surfaces of the front optical element 104 and the back optical element 106 to be based on the shape of a cylinder, with the axis of the cylinder parallel to the y-axis as shown in FIG. 1A. Having the coupling surfaces of the front optical element 104 and the back optical element 106 based on the shape of a cylinder facilities the insertion or placement of a planar film or layer between or on the front optical element 104 and the back optical element 106 because a planar film or layer can be rolled into the geometry of a cylinder without distorting the film or layer. In one embodiment, the hybrid film 320 can be inserted in the pancake lens block 102 between coupling surfaces with an adhesive element 105. Because the coupling surfaces are based on the shape of a cylinder, the hybrid film 320 can be placed flat onto either coupling surfaces 416 in a manner that would not be possible if the coupling surfaces were based on the shape of a sphere.

Figure 4A:
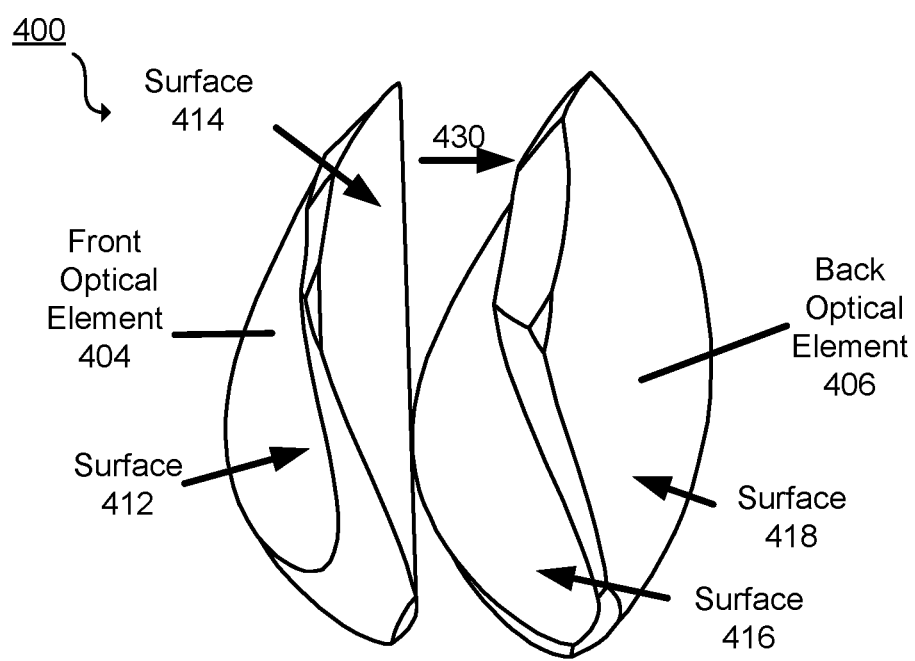
FIG. 4A is an example assembly of a monolithic pancake lens block with a wide FOV, in accordance with at least one embodiment.

FIG. 4A is an example assembly of a monolithic pancake lens block 400 (also referred to as a pancake lens block) with a wide FOV, in accordance with at least one embodiment. The pancake lens block 400 includes a front optical element 404 and a back optical element 406. The front optical element has a surface 412 (e.g., front first surface) closer to the user's eye 112 and a surface 414 (e.g., front second surface) which couples with the back optical element 406. The back optical element 406 has a surface 416 (e.g., back second surface) which couples with the front optical element 404 and a surface 418 (e.g., back first surface) which is closer to the electronic display 108. The front optical element 404 is an embodiment of the front optical element 104, and the back optical element 406 is an embodiment of the back optical element 106. Accordingly, the surfaces of each optical element are also embodiments, of the surfaces described above with reference to FIGS. 1, 2, and 3B. For example, the surface 412 may include a reflective polarizer like the reflective polarizer surface 142 discussed above with reference to FIG. 1A.

The front optical element 404 is shown to be separated from the back optical element 406, but the monolithic pancake lens block 400 is the front optical element 404 coupled to the back optical element 406, in a manner as indicated by the arrow 430 in which the surface 414 of the front optical element 404 is coupled to the surface 416 of the back optical element via, e.g., an adhesive. The front optical element 404 is shaped such that the surface 412 may have a concave spherical surface profile, and the surface 414 has a convex cylindrical surface profile. The back optical element 406 is shaped such that the surface 416 has a concave cylindrical surface profile, and the surface 418 may have a convex spherical surface profile. The layer to be bonded to surface 414 and surface 416 may be a planar surface, or sheet of material. Because surface 414 and surface 416 are based on the shape of a cylinder, the sheet can be placed flat on the surface and easily bonded to or between surfaces.

Figure 4B:
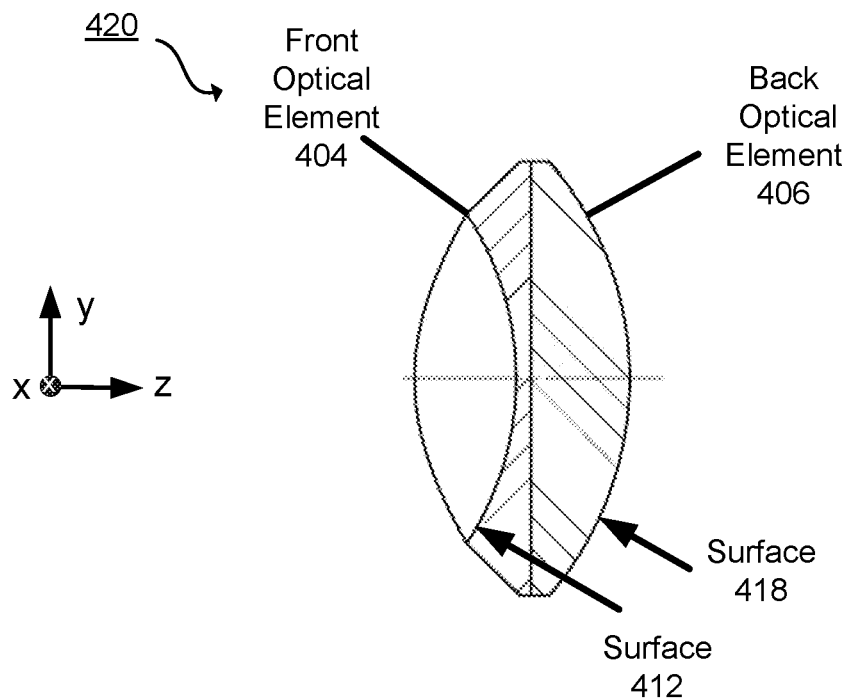
FIG. 4B shows a y/z-axis cross section of an example monolithic pancake lens block with a wide FOV, in accordance with at least one embodiment.

FIG. 4B shows a y/z-axis cross section 420 of an example monolithic pancake lens block 400 with a wide FOV, in accordance with at least one embodiment. In contrast to FIG. 4A, FIG. 4B shows the front optical element 404 and back optical element 406 coupled together.

Figure 4C:
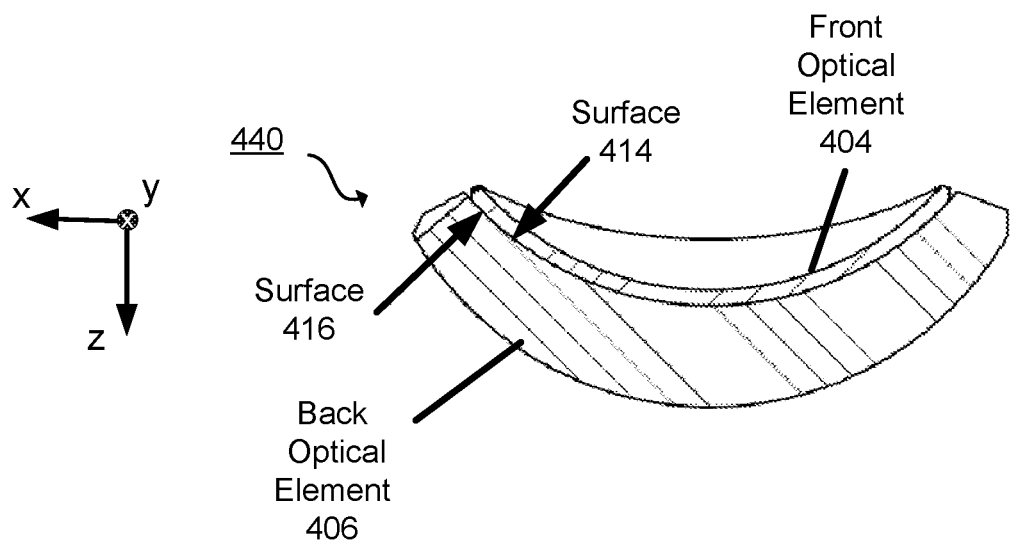
FIG. 4C shows a x/z-axis cross section of an example monolithic pancake lens block with a wide FOV, in accordance with at least one embodiment.

FIG. 4C shows a x/z-axis cross section 440 of an example monolithic pancake lens block 400 with a wide FOV, in accordance with at least one embodiment. In contrast to FIG. 4A, FIG. 4C shows the front optical element 404 and back optical element 406 coupled together.

Figure 5A:
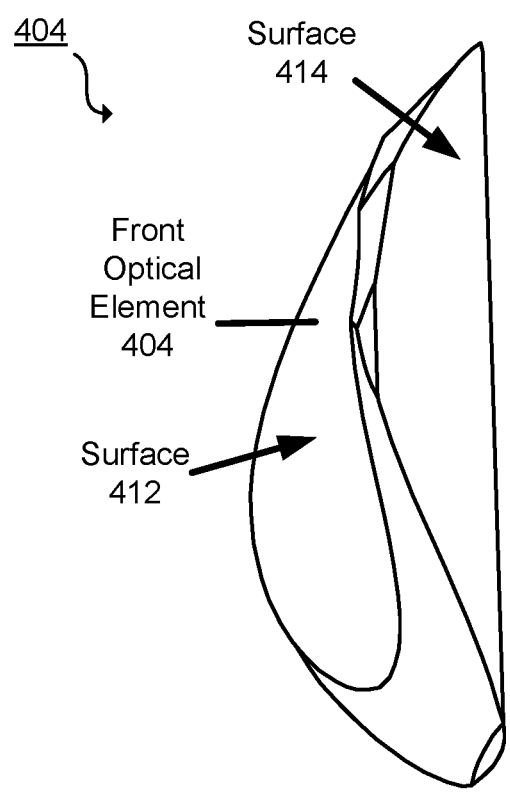
FIG. 5A is an example front optical element of a monolithic pancake lens block with wide FOV, in accordance with at least one embodiment.

FIG. 5A is an example front optical element 404 of the monolithic pancake lens block 400 with wide FOV, in accordance with at least one embodiment.

Figure 5C:
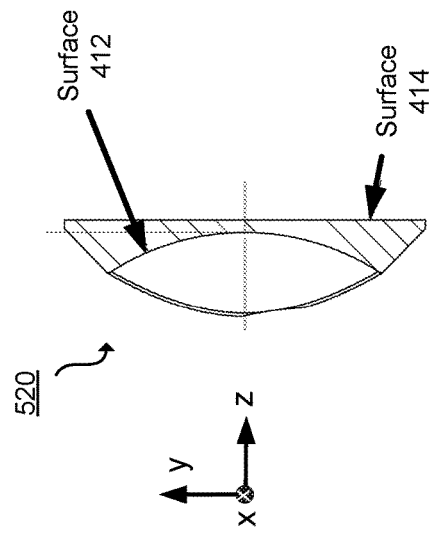
FIG. 5C shows a y/z-axis cross section of an example front optical element of a monolithic pancake lens block with wide FOV, in accordance with at least one embodiment.
Figure 5E:
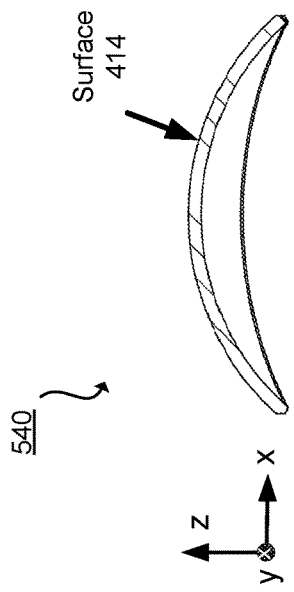
FIG. 5E shows a x/z-axis cross section of an example front optical element of a monolithic pancake lens block with wide FOV, in accordance with at least one embodiment.
Figure 5B:
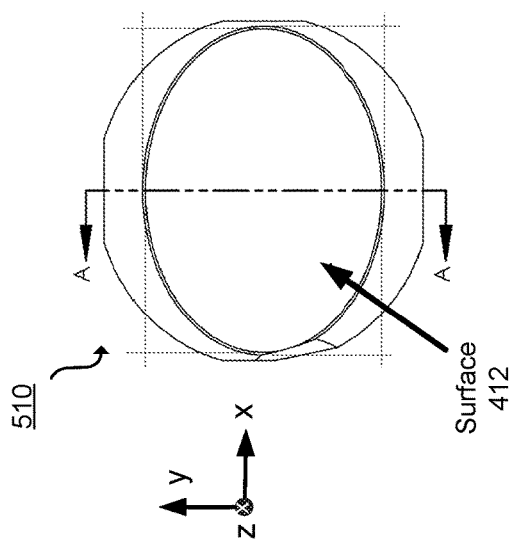
FIG. 5B shows a z-axis view of an example front optical element of a monolithic pancake lens block with wide FOV, in accordance with at least one embodiment.

FIG. 5B shows a z-axis view 510 of an example front optical element 404 of a monolithic pancake lens block 400 with wide FOV, in accordance with at least one embodiment. The z-axis view 510 shows the view of the surface 412 of the front optical element 404. A cross section along line A-A is shown in FIG. 5C.

FIG. 5C shows a y/z-axis cross section 520 of an example front optical element 404 of a monolithic pancake lens block 400 with wide FOV, in accordance with at least one embodiment. The cross section was taken along line A-A as shown in FIG. 5B.

Figure 5D:
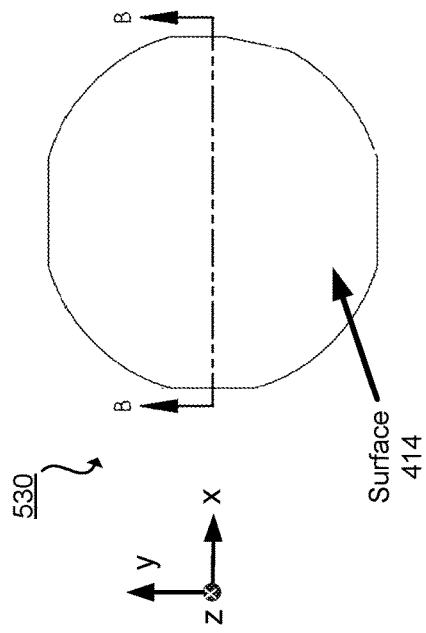
FIG. 5D shows a z-axis view of an example front optical element of a monolithic pancake lens block with wide FOV, in accordance with at least one embodiment.

FIG. 5D shows a z-axis view 530 of an example front optical element 404 of a monolithic pancake lens block 400 with wide FOV, in accordance with at least one embodiment. The z-axis view 530 shows the view of the surface 414 of the front optical element 404. A cross section along line B-B is shown in FIG. 5E.

FIG. 5E shows a x/z-axis cross section 540 of an example front optical element 404 of a monolithic pancake lens block 400 with wide FOV, in accordance with at least one embodiment. The cross section was taken along line B-B as shown in FIG. 5D.

Figure 6A:
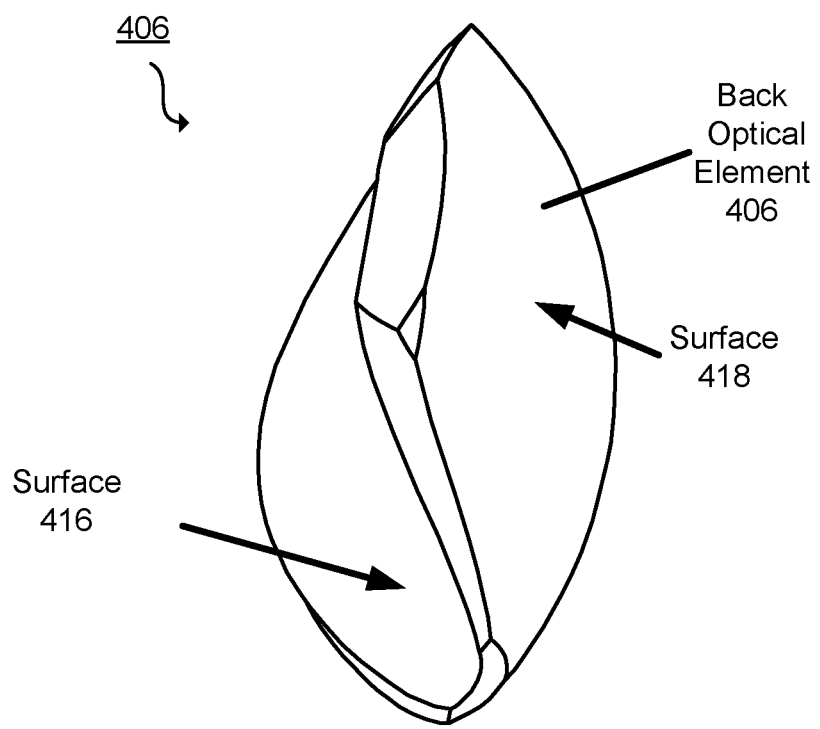
FIG. 6A is an example back optical element of a monolithic pancake lens block with wide FOV, in accordance with at least one embodiment.

FIG. 6A is an example back optical element 406 of the monolithic pancake lens block 400 with wide FOV, in accordance with at least one embodiment. The front view shows the view of surface 416 of the back optical element 406. A cross section along line A-A is shown in FIG. 6B.

Figure 6B:
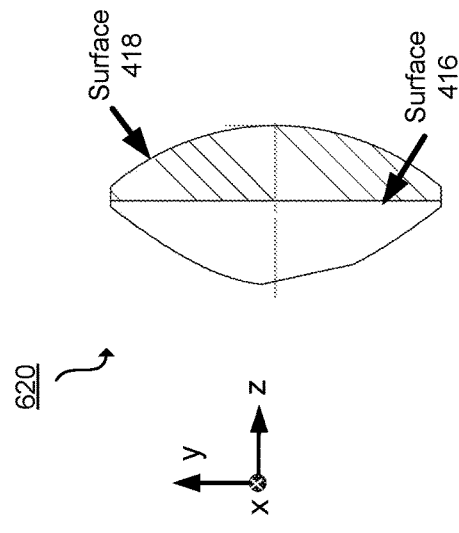
FIG. 6B shows a z-axis view of an example back optical element of a monolithic pancake lens block with wide FOV, in accordance with at least one embodiment.

FIG. 6B shows a z-axis view 610 of an example back optical element 406 of a monolithic pancake lens block 400 with wide FOV, in accordance with at least one embodiment. The z-axis view 610 shows the view of the surface 416 of the back optical element 406. A cross section along line A-A is shown in FIG. 6C.

Figure 6C:
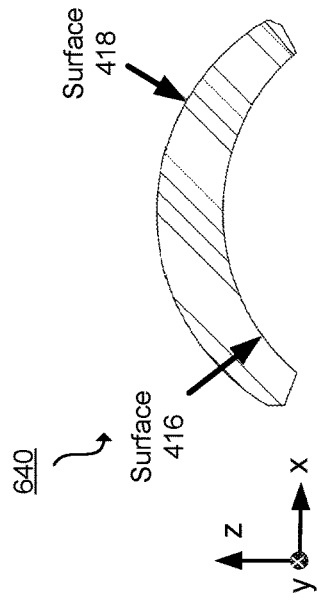
FIG. 6C shows a y/z-axis cross section of an example back optical element of a monolithic pancake lens block with wide FOV, in accordance with at least one embodiment.

FIG. 6C shows a y/z-axis cross section 620 of an example back optical element 406 of a monolithic pancake lens block 400 with wide FOV, in accordance with at least one embodiment. The cross section was taken along line A-A as shown in FIG. 6B.

Figure 6D:
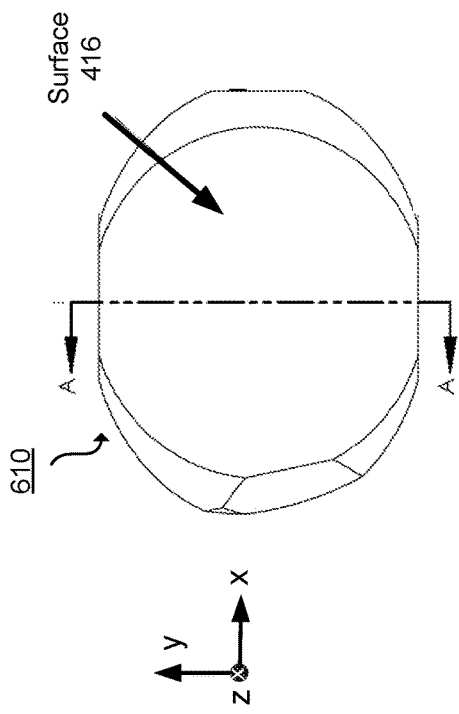
FIG. 6D shows a z-axis view of an example back optical element of a monolithic pancake lens block with wide FOV, in accordance with at least one embodiment.

FIG. 6D shows a z-axis view 630 of an example back optical element 406 of a monolithic pancake lens block 400 with wide FOV, in accordance with at least one embodiment. The z-axis view 630 shows the view of surface 418 of the back optical element 406. A cross section along line B-B is shown in FIG. 6D.

Figure 6E:
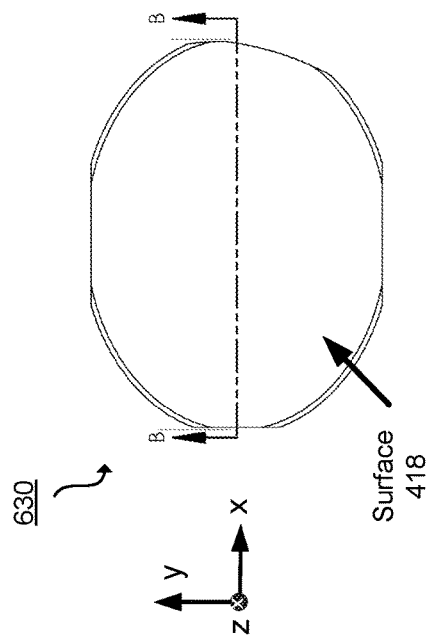
FIG. 6E shows a x/z-axis cross section of an example back optical element of a monolithic pancake lens block with wide FOV, in accordance with at least one embodiment.

FIG. 6E shows a x/z-axis cross section 640 of an example back optical element 406 of a monolithic pancake lens block 400 with wide FOV, in accordance with at least one embodiment. The cross section was taken along line B-BA as shown in FIG. 6D.

System Overview

Figure 7:
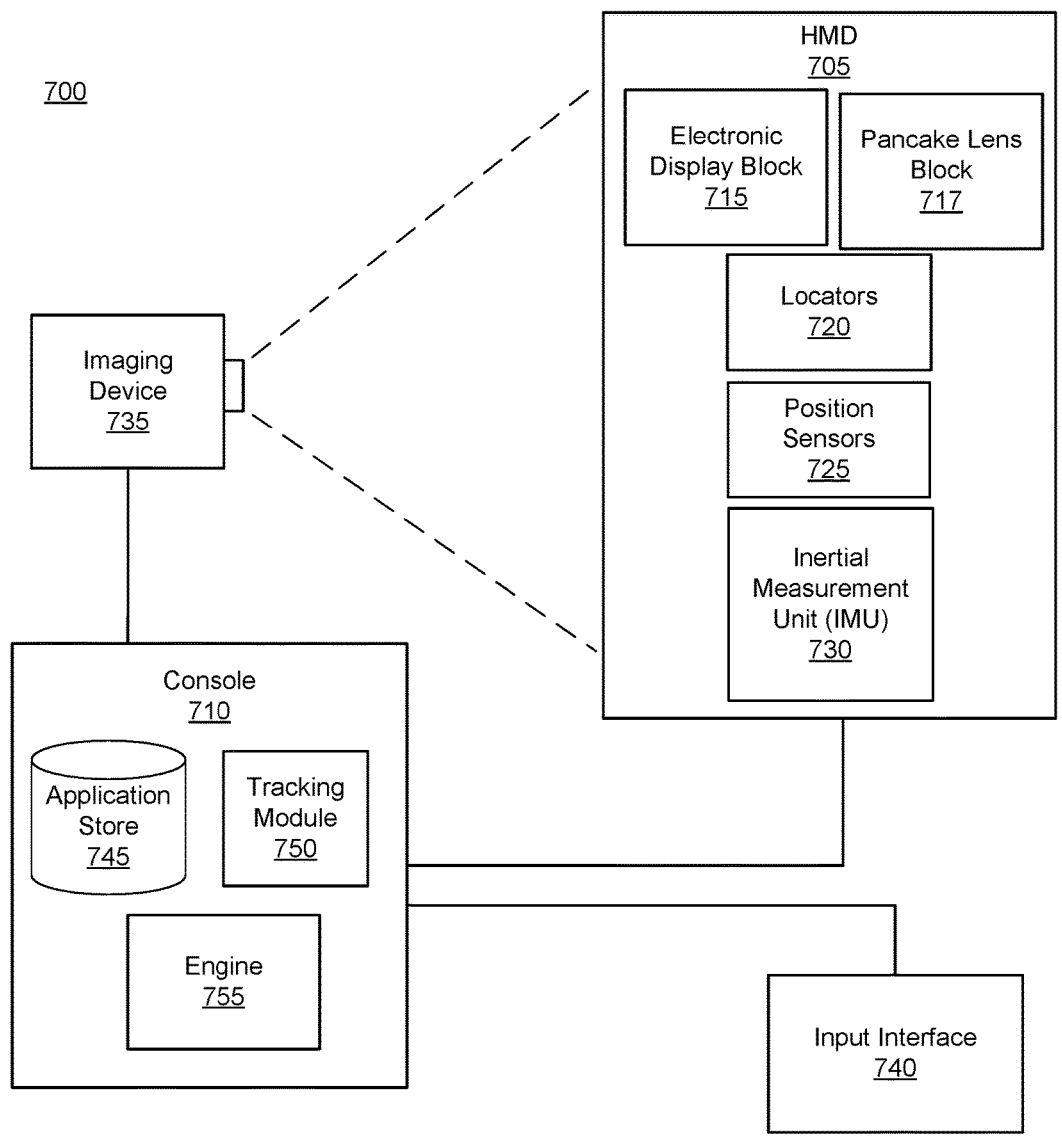
FIG. 7 is a system environment in which a HMD with a pancake lens operates, in accordance with at least one embodiment.

FIG. 7 is a block diagram of a system environment 700 including a HMD 705 that includes a pancake lens block 717. The system environment 700 shown by FIG. 7 comprises the HMD 705, an imaging device 735, and an input interface 740 that are each coupled to the console 710. While FIG. 7 shows an example system 700 including one HMD 705, one imaging device 735, and one input interface 740, in other embodiments any number of these components may be included in the system 700. For example, there may be multiple HMD 705 each having an associated input interface 740 and being monitored by one or more imaging devices 735, with each HMD 705, input interface 740, and imaging devices 735 communicating with the console 710. In alternative configurations, different and/or additional components may be included in the system environment 700. The system 700 may operate in a system environment, an augmented reality (AR) system environment, a mixed reality (MR) system environment, or some combination thereof.

The HMD 705 is a head-mounted display that presents media to a user. Examples of media presented by the HMD include one or more images, video, audio, or some combination thereof. In some embodiments, audio is presented via an external device (e.g., speakers and/or headphones) that receives audio information from the HMD 705, the console 710, or both, and presents audio data based on the audio information. An embodiment of the HMD 705 is further described below in conjunction with FIGS. 8A and 8B. The HMD 705 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 705 may present VR, AR, MR, or some combination thereof to a user. In the VR, AR and/or MR embodiments, the HMD 705 augments views of a physical, real-world environment with computer-generated elements (e.g., images, video, sound, etc.).

The HMD 705 includes an electronic display block 715, the pancake lens block 717, one or more locators 720, one or more position sensors 725, and an inertial measurement unit (IMU) 730.

The electronic display block 715 displays images to the user in accordance with data received from the console 710. In some embodiments, the electronic display block 715 includes an electronic display and an optics block. The electronic display generates image light. In various embodiments, the electronic display may comprise a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a transparent organic light emitting diode display (TOLED), some other display, a projector, or some combination thereof.

The pancake lens block 717 includes one or more optical elements including a pancake lens block 102, 152, 172, or 400 that transmit images from the electronic display to the eyes of the user. Light propagating through the pancake lens block 717 undergoes multiple reflections, so to mitigate parasitic reflections that reduce the contrast for an image displayed from the electronic display, the pancake lens block 717 is a monolithic pancake lens block with no air gaps between optical elements of the pancake lens block. The pancake lens block 717 mitigates field curvature and accordingly acts to reduce pupil swim.

The pancake lens block 717 may include optical elements for minimizing pupil swim. An optical element may be an aperture, a Fresnel lens, a convex lens, a concave lens, a filter, a polarizer, a diffuser, a fiber taper, or any other suitable optical element that affects the image light emitted from the electronic display. In some embodiments, one or more of the display block optical elements may have one or more coatings, such as anti-reflective coatings.

The pancake lens block 717 may also magnifies received light from the electronic display, corrects optical aberrations associated with the image light, and the corrected image light is presented to a user of the HMD 705. An optical element may be an aperture, a Fresnel lens, a convex lens, a concave lens, a filter, or any other suitable optical element that affects the image light emitted from the electronic display. Moreover, the optics block may include combinations of different optical elements. In some embodiments, one or more of the optical elements in the optics block may have one or more coatings, such as anti-reflective coatings. Magnification of the image light by the optics block allows elements of the electronic display to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block is designed so its effective focal length is larger than the spacing to the electronic display, which magnifies the image light projected by the electronic display. Additionally, in some embodiments, the amount of magnification may be adjusted by adding or removing optical elements.

The locators 720 are objects located in specific positions on the HMD 705 relative to one another and relative to a specific reference point on the HMD 705. A locator 720 may be a light emitting diode (LED), a corner cube reflector, a reflective marker, a type of light source that contrasts with an environment in which the HMD 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 720 are located beneath an outer surface of the HMD 705, which is transparent to the wavelengths of light emitted or reflected by the locators 720 or is thin enough to not substantially attenuate the wavelengths of light emitted or reflected by the locators 720. Additionally, in some embodiments, the outer surface or other portions of the HMD 705 are opaque in the visible band of wavelengths of light. Thus, the locators 720 may emit light in the IR band under an outer surface that is transparent in the IR band but opaque in the visible band.

The IMU 730 is an electronic device that generates fast calibration data based on measurement signals received from one or more of the position sensors 725. A position sensor 725 generates one or more measurement signals in response to motion of the HMD 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates fast calibration data indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals and calculates the estimated position of the HMD 705 from the sampled data. For example, the IMU 730 integrates the measurement signals received from the accelerometers over time to estimate a velocity vector and integrates the velocity vector over time to determine an estimated position of a reference point on the HMD 705. Alternatively, the IMU 730 provides the sampled measurement signals to the console 710, which determines the fast calibration data. The reference point is a point that may be used to describe the position of the HMD 705. While the reference point may generally be defined as a point in space; however, in practice the reference point is defined as a point within the HMD 705 (e.g., a center of the IMU 730).

The IMU 730 receives one or more calibration parameters from the console 710. As further discussed below, the one or more calibration parameters are used to maintain tracking of the HMD 705. Based on a received calibration parameter, the IMU 730 may adjust one or more IMU parameters (e.g., sample rate). In some embodiments, certain calibration parameters cause the IMU 730 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 735 generates slow calibration data in accordance with calibration parameters received from the console 710. Slow calibration data includes one or more images showing observed positions of the locators 720 that are detectable by the imaging device 735. The imaging device 735 may include one or more cameras, one or more video cameras, any other device capable of capturing images including one or more of the locators 720, or some combination thereof. Additionally, the imaging device 735 may include one or more filters (e.g., used to increase signal to noise ratio). The imaging device 735 is configured to detect light emitted or reflected from locators 720 in a field of view of the imaging device 735. In embodiments where the locators 720 include passive elements (e.g., a retroreflector), the imaging device 735 may include a light source that illuminates some or all of the locators 720, which retro-reflect the light towards the light source in the imaging device 735. Slow calibration data is communicated from the imaging device 735 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The input interface 740 is a device that allows a user to send action requests to the console 710. An action request is a request to perform a particular action. For example, an action request may be to start or end an application or to perform a particular action within the application. The input interface 740 may include one or more input devices. Example input devices include: a keyboard, a mouse, a game controller, or any other suitable device for receiving action requests and communicating the received action requests to the console 710. An action request received by the input interface 740 is communicated to the console 710, which performs an action corresponding to the action request. In some embodiments, the input interface 740 may provide haptic feedback to the user in accordance with instructions received from the console 710. For example, haptic feedback is provided when an action request is received, or the console 710 communicates instructions to the input interface 740 causing the input interface 740 to generate haptic feedback when the console 710 performs an action.

The console 710 provides media to the HMD 705 for presentation to the user in accordance with information received from one or more of: the imaging device 735, the HMD 705, and the input interface 740. In the example shown in FIG. 7, the console 710 includes an application store 745, a tracking module 750, and a virtual reality (VR) engine 755. Some embodiments of the console 710 have different modules than those described in conjunction with FIG. 7. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the HMD 705 or the input interface 740. Examples of applications include: gaming applications, conferencing applications, video playback application, or other suitable applications.

The tracking module 750 calibrates the system 700 using one or more calibration parameters and may adjust one or more calibration parameters to reduce error in determination of the position of the HMD 705. For example, the tracking module 750 adjusts the focus of the imaging device 735 to obtain a more accurate position for observed locators on the HMD 705. Moreover, calibration performed by the tracking module 750 also accounts for information received from the IMU 730. Additionally, if tracking of the HMD 705 is lost (e.g., the imaging device 735 loses line of sight of at least a threshold number of the locators 720), the tracking module 750 re-calibrates some or all of the system environment 700.

The tracking module 750 tracks movements of the HMD 705 using slow calibration information from the imaging device 735. The tracking module 750 determines positions of a reference point of the HMD 705 using observed locators from the slow calibration information and a model of the HMD 705. The tracking module 750 also determines positions of a reference point of the HMD 705 using position information from the fast calibration information. Additionally, in some embodiments, the tracking module 750 may use portions of the fast calibration information, the slow calibration information, or some combination thereof, to predict a future location of the HMD 705. The tracking module 750 provides the estimated or predicted future position of the HMD 705 to the engine 755.

The engine 755 executes applications within the system environment 700 and receives position information, acceleration information, velocity information, predicted future positions, or some combination thereof of the HMD 705 from the tracking module 750. Based on the received information, the engine 755 determines content to provide to the HMD 705 for presentation to the user. For example, if the received information indicates that the user has looked to the left, the engine 755 generates content for the HMD 705 that mirrors the user's movement in a virtual environment. Additionally, the engine 755 performs an action within an application executing on the console 710 in response to an action request received from the input interface 740 and provides feedback to the user that the action was performed. The provided feedback may be visual or audible feedback via the HMD 705 or haptic feedback via the input interface 740.

Figure 8A:
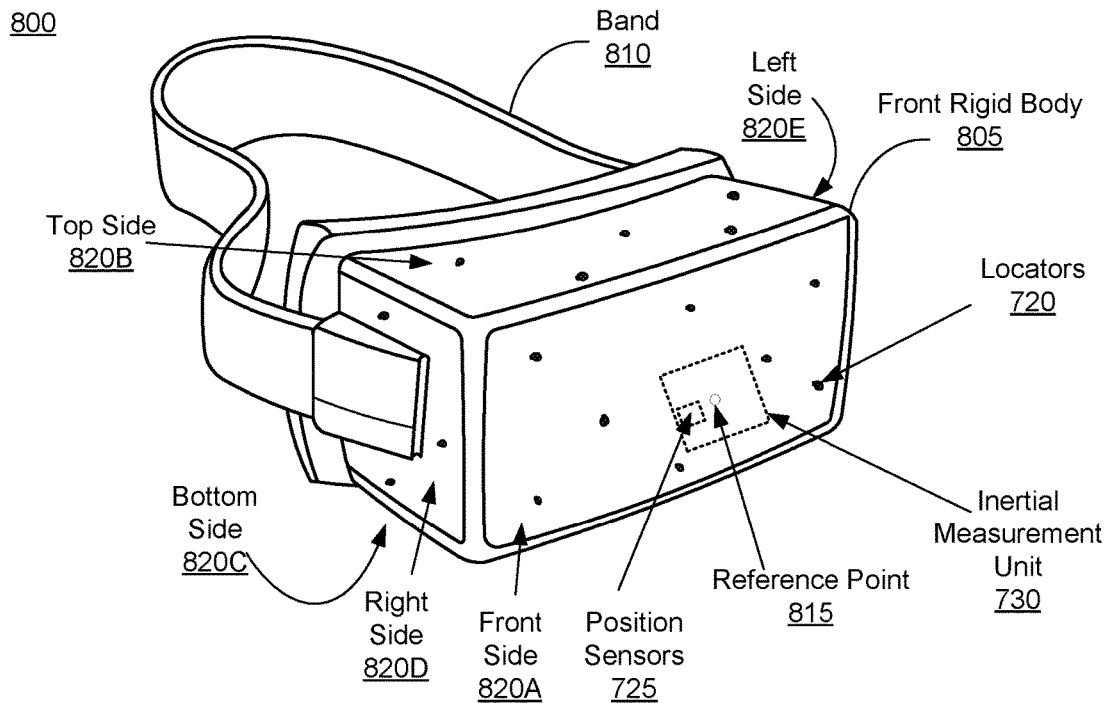
FIG. 8A is a diagram of a HMD, in accordance with at least one embodiment.

FIG. 8A is a diagram of the HMD 705 of FIG. 7, in accordance with an embodiment. The HMD 705 includes a front rigid body 805 and a band 810. The front rigid body 805 includes one or more electronic display elements of the electronic display 828 and optics block 818 (not shown in FIG. 8A), the IMU 730, the one or more position sensors 725, and the locators 720. In the embodiment shown by FIG. 8A, the position sensors 725 are located within the IMU 730, and neither the IMU 730 nor the position sensors 725 are visible to the user.

The locators 720 are located in fixed positions on the front rigid body 805 relative to one another and relative to a reference point 815. In the example of FIG. 8A, the reference point 815 is located at the center of the IMU 730. Each of the locators 720 emit light that is detectable by the imaging device 835. Locators 720, or portions of locators 720, are located on a front side 820A, a top side 820B, a bottom side 820C, a right side 820D, and a left side 820E of the front rigid body 805 in the example of FIG. 8A.

Figure 8B:
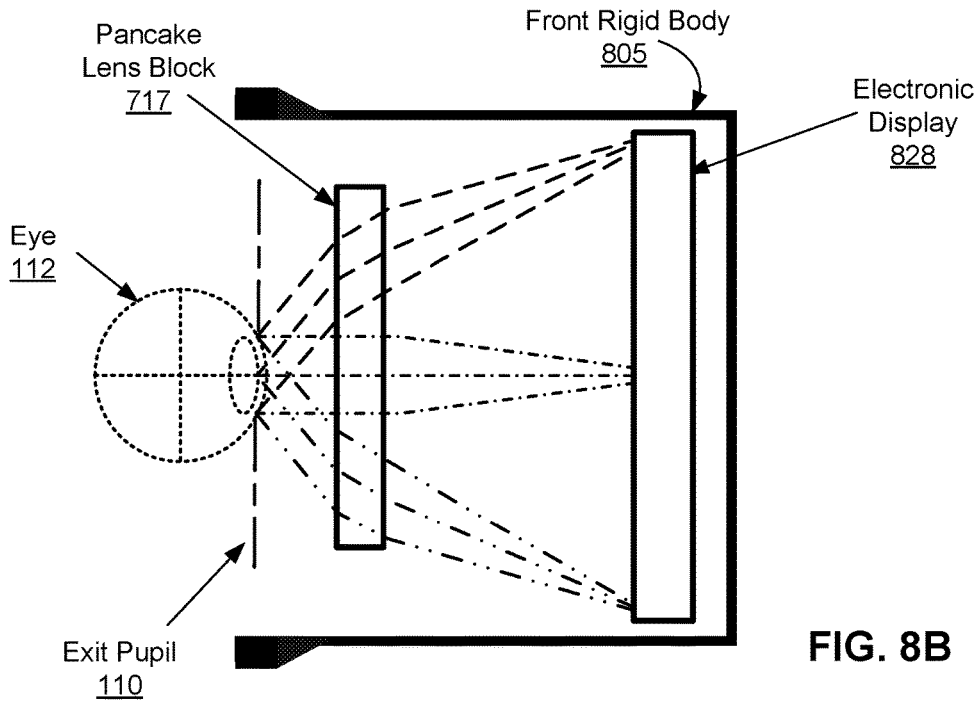
FIG. 8B shows a cross section of the diagram of HMD, in accordance with at least one embodiment.

FIG. 8B is a cross section 825 of the front rigid body 805 of the embodiment of a HMD 705 shown in FIG. 8A. As shown in FIG. 8B, the front rigid body 805 includes the electronic display 828 and a pancake lens block 717 that provides altered image light to an exit pupil 110. The pancake lens block 717 includes a pancake lens block 102 or 400. The exit pupil 110 is the location of the front rigid body 805 where a user's eye 112 is positioned. For purposes of illustration, FIG. 8B shows a cross section 825 associated with a single eye 112, but another electronic display, separate from the electronic display 828, provides image light altered by the optics block 818 to another eye of the user.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
    an electronic display configured to display image light; and
    a pancake lens block comprising:
        a hybrid film configured to act as both a reflective polarizer and a quarter waveplate, wherein the hybrid film consists essentially of:
            a plurality of first plastic sheets having an ordinary index along a first axis and an extraordinary index along a second axis, the first and second axis are 90 degrees from each other; and
            a plurality of second plastic sheets having an ordinary index along a first axis and a second axis, and the axes of a portion of the plurality of first plastics sheets and a portion of the plurality of second plastic sheets are oriented 45 degrees to each other;
        a back curved optical element that alters the image light, the back curved optical element including a back first surface and a back second surface, the back first surface configured to receive the image light, and the back second surface configured to output altered image light; and
        a front curved optical element that further alters the altered image light, the front curved optical element including a front first surface and a front second surface, the front second surface coupled to the back second surface such that the back curved optical element and the front curved optical element form a monolithic optical element, wherein the hybrid film is between the back second surface and the front second surface, and a first portion of the altered image light is reflected by the front first surface of the front curved optical element toward the back curved optical element, and the hybrid film reflects a second portion of the first portion of the altered image light back to the front curved optical element and changes a polarization from circular to linear for transmission to an exit pupil of the HMD.

2. The HMD of claim 1, wherein the back second surface is coated with the hybrid film and the hybrid film is coupled to the front second surface.

3. The HMD of claim 1, wherein the front second surface is coated with the hybrid film and the hybrid film is coupled to the back second surface.

4. The HMD of claim 1, wherein the back second surface of the back curved optical element has a concave cylindrical surface profile, and the front second surface of the front curved optical element has a convex cylindrical surface profile that coincides with the concave cylindrical surface profile of the back curved optical element, wherein the front second surface and the back second surface are coupled to each other with an adhesive element.

5. The HMD of claim 1, the pancake lens block further comprises:
    a back waveplate on the back first surface of the back curved optical element;
    and a polarized reflector on the front first surface of the front curved optical element and configured to (1) transmit light polarized in a direction parallel to a polarization direction of the polarized reflector and (2) reflect light polarized in a direction perpendicular to the polarization direction.

6. The HMD of claim 5, wherein the hybrid film is partially reflective reflecting a first percentage of the light and transmitting a second percentage of the light at each instance of the light being incident on the back curved optical element.

7. The HMD of claim 5, wherein light incident on the front second surface of the front curved optical element is polarized in a direction other than the polarization direction of the polarized reflector by at least one of the back waveplate or the hybrid film and reflected back to the back optical element.

8. The HMD of claim 5, wherein the first portion of the altered image light is polarized in the direction parallel to the polarization direction of the polarized reflector by at least one of the back waveplate or the hybrid film.

9. The HMD of claim 1, wherein a shape of the back first surface is a portion of a concave spherical shape.

10. The HMD of claim 1, wherein a shape of the front first surface is a portion of a convex spherical shape.

11. The HMD of claim 1, the pancake lens block further comprises a back waveplate, wherein a curvature of the hybrid film and the back waveplate have an amount of concentricity that is based in part on a contrast requirement for the pancake lens block.

12. The HMD of claim 1, wherein the altered image light has a contrast value of at least three times a contrast value of altered image light from a pancake lens block in which a front second surface is separated from a back second surface by an air gap.

13. A head mounted display (HMD) comprising:
an electronic display configured to display image light; and
a pancake lens block comprising:
- a hybrid film configured to act as both a reflective polarizer and a quarter waveplate, wherein the hybrid film consists essentially of:
  - a plurality of first plastic sheets having an ordinary index along a first axis and an extraordinary index along a second axis, the first and second axis are 90 degrees from each other; and
  - a plurality of second plastic sheets having an ordinary index along a first axis and a second axis, and the axes of a portion of the plurality of first plastics sheets and a portion of the plurality of second plastic sheets are oriented 45 degrees to each other;
- a back curved optical element that alters the image light, the back curved optical element including a back first surface and a back second surface, the back first surface configured to receive the image light, and the back second surface configured to output altered image light; and
- a front curved optical element that further alters the altered image light, the front curved optical element including a front first surface and a front second surface, the front second surface coupled to the back second surface such that the back curved optical element and the front curved optical element form a monolithic optical element, wherein the hybrid film is between the back second surface and the first second surface, and a first portion of the altered image light is reflected by the front first surface of the front curved optical element toward the back curved optical element, and the hybrid film reflects a second portion of the first portion of the altered image light back to the front curved optical element and changes a polarization from circular to linear for transmission to an exit pupil of the HMD, the altered image light having a field of view greater than 180 degrees in at least one dimension.

14. The HMD of claim 13, wherein the back second surface of the back curved optical element has a concave cylindrical surface profile, and the front second surface of the front curved optical element has a convex cylindrical surface profile that coincides with the concave cylindrical surface profile of the back curved optical element, wherein the front second surface and the back second surface are coupled to each other with an adhesive element.

15. The HMD of claim 13, wherein a shape of the back first surface is a portion of a concave spherical shape and a shape of the front first surface is a portion of a convex spherical shape.

16. The HMD of claim 13, the pancake lens block further comprises:
- a back waveplate, wherein a curvature of the hybrid film and the back waveplate have an amount of concentricity that is based in part on a contrast requirement for the pancake lens block.

* * * * *